No. 840,483. PATENTED JAN. 8, 1907
E. E. EARNSHAW.
COUPLING FOR CONVERGING ENDS OF CANOPY STANDARDS
FOR SHOW CASES, &c.
APPLICATION FILED JULY 25, 1906
FIG:1
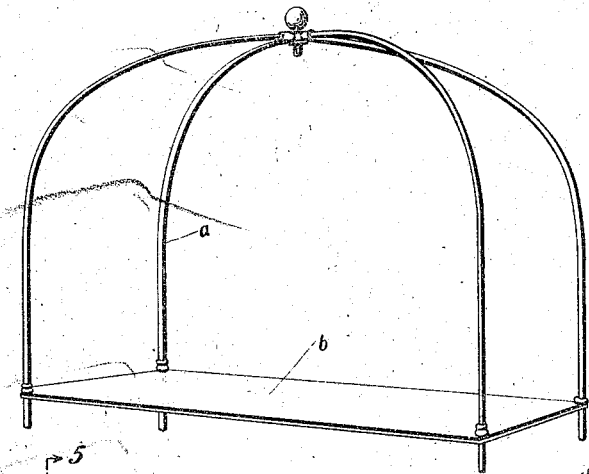
FIG:2
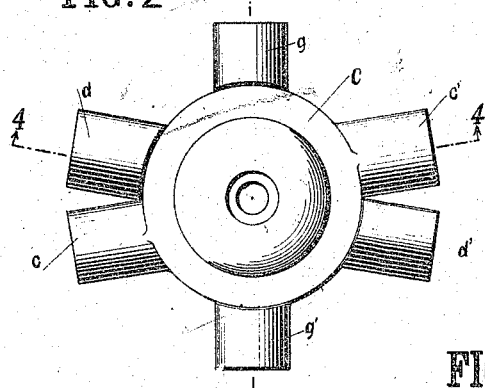
FIG:3
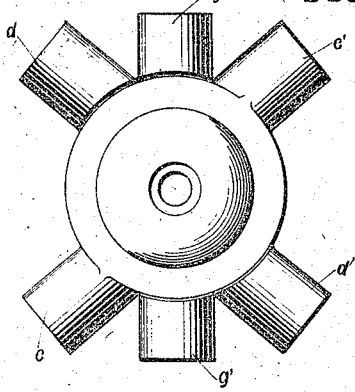
FIG:1ª
FIG:4
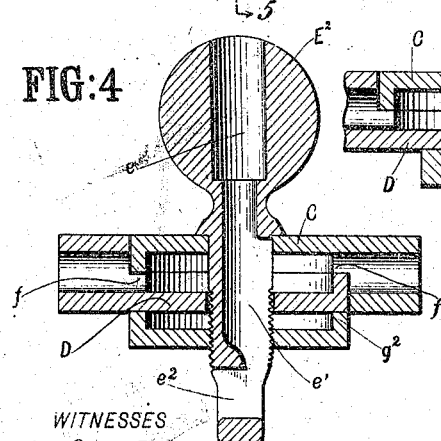
FIG:5
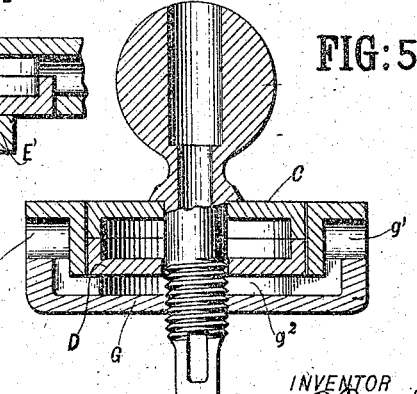
WITNESSES
Max B. A. Doring.
L. L. Browning.
INVENTOR
Elmer E. Earnshaw
BY
Edward C. Davidson
ATTORNEY

UNITED STATES PATENT OFFICE.

ELMER E. EARNSHAW, OF NEW YORK, N. Y., ASSIGNOR TO NATIONAL CIGAR STANDS COMPANY, OF JERSEY CITY, NEW JERSEY, A CORPORATION OF NEW JERSEY.

COUPLING FOR CONVERGING ENDS OF CANOPY-STANDARDS FOR SHOW-CASES, &c.

No. 840,483.   Specification of Letters Patent.   Patented Jan. 8, 1907.

Application filed July 25, 1906. Serial No. 327,607.

*To all whom it may concern:*

Be it known that I, ELMER E. EARNSHAW, a citizen of the United States, residing in the borough of Manhattan, city, county, and State of New York, have invented a certain new and useful Improved Coupling for Converging Ends of Canopy-Standards for Show-Cases, &c., of which the following is a specification.

In the accompanying drawings, Figure 1 is a perspective view showing the top of a show-case supporting four curved canopy-standards, whose converging ends are united by a coupling-head; Fig. 1$^a$, an enlarged vertical section through the coupling-head shown in Fig. 1; Fig. 2, a top plan view of a coupling-head with six bosses to receive the convergent ends of six canopy-standards; Fig. 3, a similar view of the same device, showing the bosses in different angular position; Fig. 4, a section on the line 4 4 of Fig. 2, and Fig. 5 a section on the line 5 5 of Fig. 2.

When there are but four curved standards $a$ springing from the base $b$, it is only necessary to adapt the coupling to bases of different rectangular shape that the pair of opposite bosses $c$ $c'$ and the pair of opposite bosses $d$ $d'$ should be adjustable with respect to each other. The bosses $c$ $c'$ may therefore be formed integrally with a centrally-apertured flanged plate C and the bosses $d$ $d'$ formed integral with a corresponding centrally-apertured concentric flanged plate D. By turning these plates with respect to each other the angular relation of the two pairs of radial bosses may be varied, as seen in Figs. 2 and 3. The edges of the abutting flanges of the plates C D turn upon each other and may be clamped together in desired position by means of a bolt E, threaded to receive a clamp-nut E'. This provides for adjusting the bosses to different angles according to the width of the base $b$, from the corners of which the standards spring. The bolt E is preferably formed with an enlarged head E$^2$ and with a bore $e$, opening into a groove $e'$, which runs into a slot $e^2$ in the lower end of the bolt. The bosses $c$ $c'$ are cut away at the bottom to accommodate the flange of plate D and the bosses $d$ $d$ are cut away at the top to accommodate the flange of plate C. There are therefore openings $f$ respectively below and above the flanges, through either of which an electric conductor entered in the bore $e$ may be carried into one of the hollow bosses and down through the corresponding standard, which may be hollow, or such an electrical conductor can be passed through the groove $e'$ for the purpose of affording illumination of any device that may be suspended from the slot $e^2$.

Where it is desired to have additional standards springing from the base midway between the corners, either at the ends or at the front and back, an additional pair of bosses is required. They should be diametrically opposite the axis of the bolt E and should be capable of adjustment independently of the other pairs of bosses. To accomplish this, the nut E' is replaced by a nut-plate G, having diametrically opposite upturned parts formed as hollow bosses $g$ $g'$. This plate is also provided with an upturned flange $g^2$ to form a horizontal seat for the plate D. The nut-plate G may be set to bring its bosses in proper position to receive the ends of the additional standards, and all three plates may then be securely clamped together by rotation of the bolt E. The plates C D and bolt E are the same whether the head is adapted for four or six standards, and where there are to be six it is only necessary to substitute the nut-plate G for the nut E'.

It is preferred, as shown, that the ends of the standards shall fit into the sockets formed by the bosses instead of having the standards fit over the bosses.

I claim as my invention—

1. A coupling for convergent ends of canopy-standards, comprising two plates adjustable one upon another and each having a pair of opposite bosses to hold the standards, and means for clamping the plates.

2. A coupling for convergent ends of canopy-standards, comprising two plates adjustable one upon another and each having a pair of opposite bosses to hold the standards, and a hollow bolt for clamping the plates through the bore of which an electrical conductor may be passed.

3. A coupling for convergent ends of canopy-standards, comprising two concentric plates having flanges which abut and bear against each other and four hollow bosses, two carried by one plate and two by the other, and means for clamping the plates together when the bosses are in adjusted position.

4. A coupling for convergent ends of canopy-standards, comprising two concentric plates having flanges which abut and bear against each other and four hollow bosses, two carried by one plate and two by the other, a threaded bolt passing through the plates and an end plate applied thereto and having diametrically opposite bosses.

5. A coupling for convergent ends of canopy-standards, comprising three plates, each having a pair of opposite bosses and means for clamping them together in any position to which they may be adjusted.

In testimony whereof I have hereunto subscribed my name.

ELMER E. EARNSHAW.

Witnesses:
GEO. M. GALES,
JNO. F. THOMPSON.